(12) United States Patent
Hu et al.

(10) Patent No.: US 9,746,606 B2
(45) Date of Patent: Aug. 29, 2017

(54) WAVEGUIDE STRUCTURE, WAVEGUIDE COUPLING STRUCTURE, AND PRODUCTION METHOD

(71) Applicant: Huawei Technologies Co., Ltd., Shenzhen, Guangdong (CN)

(72) Inventors: Jing Hu, Shenzhen (CN); Xiaoping Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/152,831

(22) Filed: May 12, 2016

(65) Prior Publication Data

US 2016/0252678 A1 Sep. 1, 2016

Related U.S. Application Data

(63) Continuation of application No. PCT/CN2013/087018, filed on Nov. 13, 2013.

(51) Int. Cl.
*G02B 6/12* (2006.01)
(52) U.S. Cl.
CPC ...... *G02B 6/12011* (2013.01); *G02B 6/12023* (2013.01); *G02B 6/12026* (2013.01)
(58) Field of Classification Search
CPC ............ G02B 6/12011; G02B 6/12023; G02B 6/12026
See application file for complete search history.

(56) References Cited

U.S. PATENT DOCUMENTS

| 6,529,649 B1 * | 3/2003 | Soole ................ G02B 6/12021 385/14 |
| 8,938,137 B2 * | 1/2015 | Doerr ................ G02B 6/12011 385/14 |

(Continued)

FOREIGN PATENT DOCUMENTS

| CN | 1366193 A | 8/2002 |
| CN | 102077124 A | 5/2011 |

OTHER PUBLICATIONS

Zhou Qincun et al., "Calculation of the Far Field Pattern from a Planar Waveguide Using a Modified Gaussian Beam Approximation", Acta Optica Sinica, vol. 23, No. 5, May 2003, p. 587-591.

(Continued)

*Primary Examiner* — Rhonda Peace

(57) ABSTRACT

The present invention provides three waveguide structures, including a protruding-type waveguide structure, a buried-type waveguide structure, and a redeposited-type waveguide structure, the protruding-type waveguide structure includes two axisymmetrically disposed first ends, and the first end is sequentially divided into a first region, a second region, and a third region in a direction toward an axis of symmetry; and the waveguide structure includes a first silicon substrate layer, a second silicon substrate layer, a first silicon dioxide layer, a second silicon dioxide layer, and a first silicon waveguide layer. The waveguide structure and the waveguide coupling structure that are provided in the present invention have advantages of a small size, low polarization dependence, and low temperature sensitivity, and a crosstalk value is greater than 25 dB, which meets a requirement of a passive optical network system, and provides feasibility for commercialization of the arrayed waveguide grating.

7 Claims, 8 Drawing Sheets

(56) References Cited

U.S. PATENT DOCUMENTS

| | | | |
|---|---|---|---|
| 9,405,066 B2* | 8/2016 | Mahgerefteh | G02B 6/124 |
| 2002/0136492 A1 | 9/2002 | Nara et al. | |
| 2005/0180678 A1 | 8/2005 | Panepucci et al. | |
| 2010/0316342 A1 | 12/2010 | Casey et al. | |
| 2011/0102777 A1 | 5/2011 | Zinoviev et al. | |
| 2015/0293299 A1* | 10/2015 | Xu | G02B 6/1228 385/28 |
| 2016/0187579 A1* | 6/2016 | Henze | G02B 6/1223 385/132 |
| 2016/0252678 A1* | 9/2016 | Hu | G02B 6/12011 |
| 2017/0052317 A1* | 2/2017 | Mahgerefteh | G02B 6/1228 |

OTHER PUBLICATIONS

Zhiming Liu et al., "A Modified Algorithm Based on Fourier Optics for Modeling of Arrayed Waveguide Grating", Journal of Beijing Jiaotong University, vol. 34, No. 6, Dec. 2010, p. 76-85.

Hidetaka Nishi et al., "22-Gbit/s x 16-ch WDM receiver based on a Si—Ge-silica monolithic photonic platform and its application to 40-km transmission", Optical Society of America, 2013, 3 pages.

Wim Bogaerts et al., "Compact Wavelength-Selective Functions in Silicon-on-Insulator Photonic Wires", IEEE Journal of Selected Topics in Quantum Electronics, vol. 12, No. 6, Nov./Dec. 2006, p. 1394-1401.

Duk-Jun Kim et al., "Crosstalk Reduction in a Shallow-Etched Silicon Nanowire AWG", IEEE Photonics Technology Letters, vol. 20, No. 19, Oct. 1, 2008, p. 1615-1617.

Linnell Martinez et al., "High confinement suspended micro-ring resonators in silicon-on-insulator", Optics Express, vol. 14, No. 13, Jun. 26, 2006, p. 6259-6263.

T.H. Stievater et al., "Low-loss suspended quantum well waveguides", Optics Express, vol. 16, No. 4, Feb. 18, 2008, p. 2621-2627.

Meint K. Smit et al., "PHASAR-Based WDM-Devices: Principles, Design and Applications", IEEE Journal of Selected Topics in Quantum Electronics, vol. 2, No. 2, Jun. 1996, p. 236-250.

Katsunari Okamoto, "Recent Advancement in AWG Technology", 2012 17th Opto-Electronics and Communications Conference (OECC 2012) Technical Digest Jul. 2012, p. 85-86.

X. Fu et al., "Ultra-small Si-nanowire-based 400 GHz-spacing 15×15 arrayed-waveguide grating router with microbends", Electronics Letters, vol. 47, No. 4, Feb. 17, 2011, 2 pages.

Huamao Huang, "The Study of Silicon Photonic-Wires based Arrayed Waveguide Grating", Huazhong University of Science & Technology, May 24, 2010, 193 pages.

* cited by examiner

WAVEGUIDE STRUCTURE, WAVEGUIDE COUPLING STRUCTURE, AND PRODUCTION METHOD

CROSS-REFERENCE TO RELATED APPLICATIONS

This application is a continuation of International Application No. PCT/CN2013/087018, filed on Nov. 13, 2013, which is hereby incorporated by reference in its entirety.

TECHNICAL FIELD

The present invention relates to the field of optical communication devices, and in particular, to a waveguide structure, a waveguide coupling structure, and a production method.

BACKGROUND

With renewal and replacement of network products, a size and power consumption of a module used in a network are continuously decreasing, so as to meet requirements for continuous cost reduction and continuous performance improvement. Featuring a subminiature size, a low cost, and the like, silicon-based photonic devices have attracted wide attention from the industry in recent years, and become one of key directions that are considered in renewal and replacement of network products.

In the prior art, a process error of a silicon waveguide has a relatively high impact on a refractive index of the waveguide. The impact causes random changes in refractive indexes of different parts of the silicon waveguide. Consequently, there is a relatively significant random change in an operating wavelength of a silicon-based photonic device, or performance of crosstalk between paths of the device deteriorates. In addition, a relatively large refractive index difference further causes quite high polarization dependence of the silicon waveguide, which is unfavorable for implementing polarization-insensitive work. Further, the silicon waveguide is highly sensitive to temperature, and can work properly only within a proper temperature range.

A silicon-based arrayed waveguide grating is a quite important silicon-based photonic device. Because the silicon-based arrayed waveguide grating can implement wavelength splitting for a large quantity of wavelengths at the same time and control multiple wavelengths in a unified manner, and has a wide free spectral range and a compact device size, the silicon-based arrayed waveguide grating is considered as an important alternative to upgrading an optical splitter in network products.

However, the silicon-based arrayed waveguide grating is still restricted in terms of materials, and performance of an optical splitter to which the silicon-based arrayed waveguide grating is applied still cannot meet a requirement, which are mainly reflected as follows: Firstly, the silicon-based arrayed waveguide grating is highly sensitive to a process error, and has a crosstalk value of less than 15 dB, which cannot meet application requirements of some networks. For example, a crosstalk value of at least 25 dB is required in a passive optical network (Passive Optical Network, PON) for short, and a crosstalk value of at least 35 dB is required in a 40G-PON with two stages of optical splitters. Secondly, the silicon-based arrayed waveguide grating is highly sensitive to temperature, and there is no mature a thermal solution; therefore, a semiconductor thermoelectric cooler (TEC for short) is required to perform temperature control, which also increases power consumption. Thirdly, because a refractive index difference of a silicon waveguide is large, polarization dependence is quite high. Because of the quite high polarization dependence, the silicon-based arrayed waveguide grating can hardly implement polarization-insensitive work required by optical splitting; instead, a polarization diversity manner needs to be used, that is, two devices are used to respectively process two beams of polarized light. However, in the polarization diversity manner, a device volume definitely increases, which is unfavorable for device miniaturization. In view of the foregoing undesirable factors, performance of the silicon-based arrayed waveguide grating urgently needs to be improved.

According to a result of a theoretical research, crosstalk of an arrayed waveguide grating is mainly subject to a random phase error of an arrayed waveguide that is caused by a process error. Causes for generation of this random phase error are mainly classified into two types: One type is non-uniformity of a material of an arrayed waveguide, and the other type is a random change in a refractive index of an arrayed waveguide. Generally, a random change in a refractive index of an arrayed waveguide is a leading factor that causes a random phase error. Therefore, researchers mainly optimize crosstalk performance of an arrayed waveguide grating by changing a structure of an arrayed waveguide. Currently, two methods may be used to increase a crosstalk value of a silicon-based arrayed waveguide grating: increasing a width of an arrayed waveguide, and using a ridge waveguide with a relatively small refractive index difference as an arrayed waveguide. However, even if these optimization methods are used, the crosstalk value of the arrayed waveguide grating still cannot meet a system requirement. Specific comparative embodiments are as follows:

Comparative Embodiment 1

In a paper entitled *Crosstalk reduction in a shallow-etched silicon nanowire AWG* published in PTL (Photonics Technology Letters) in 2008, persons such as Duk-Jun Kim proposed a solution in which a ridge silicon waveguide is used as an arrayed waveguide in an arrayed waveguide grating. In this solution, a condition of deep ultraviolet photolithography of 248 nm is used, and the arrayed waveguide grating can implement a crosstalk value of 18 dB. However, this solution cannot be used in a transverse magnetic (TM for short) mode, and therefore is not suitable for a design requirement of an optical splitter.

Comparative Embodiment 2

In a paper entitled *Compact wavelength-selective functions in silicon-on-insulator photonic wires* published in JSTQE (Journal of Selected Topics in Quantum Electronics) in 2006, persons such as Wim Bogaerts proposed a solution in which a widened silicon waveguide is used as an arrayed waveguide in an arrayed waveguide grating. In this solution, a condition of deep ultraviolet photolithography of 248 nm is used, and the arrayed waveguide grating can implement crosstalk of 18 dB-20 dB. However, in this solution, a crosstalk value cannot meet a design requirement of an optical splitter.

SUMMARY

To resolve the foregoing technical problem, embodiments of the present invention provide a waveguide structure that has low polarization dependence and low temperature sensitivity, and in which a crosstalk value meets a requirement.

To achieve the foregoing objective, the embodiments of the present invention provide the following technical solutions:

According to a first aspect, a waveguide structure is provided, where the waveguide structure is applied to a straight waveguide part of an arrayed waveguide in a silicon-on-insulator-based arrayed waveguide grating; the waveguide structure includes two axisymmetrically disposed first ends, and the first end is sequentially divided into a first region, a second region, and a third region in a direction toward an axis of symmetry; and the waveguide structure includes a first silicon substrate layer, a second silicon substrate layer, a first silicon dioxide layer, a second silicon dioxide layer, and a first silicon waveguide layer;

in the first region, the first silicon substrate layer, the second silicon substrate layer, the first silicon dioxide layer, the second silicon dioxide layer, and the first silicon waveguide layer are sequentially disposed; a width of the first silicon waveguide layer is a constant value; and an optical signal is transmitted at the first silicon waveguide layer;

in the second region, the second silicon substrate layer is etched as a first air layer; the first silicon substrate layer, the first air layer, the first silicon dioxide layer, the second silicon dioxide layer, and the first silicon waveguide layer are sequentially disposed; a width of the first silicon waveguide layer gradually decreases in the direction toward the axis of symmetry; and the optical signal is gradually transmitted from the first silicon waveguide layer to a first ridge silicon dioxide waveguide layer that includes the first silicon dioxide layer and the second silicon dioxide layer; and in the third region, the second silicon substrate layer is etched as the first air layer; the first silicon substrate layer, the first air layer, the first silicon dioxide layer, and the second silicon dioxide layer are sequentially disposed; a width of the first silicon waveguide layer is 0; and the optical signal is transmitted at the first ridge silicon dioxide waveguide layer that includes the first silicon dioxide layer and the second silicon dioxide layer.

In a first possible implementation manner, the first silicon dioxide layer includes multiple parallel first silicon dioxide layer units that are arrayed at intervals, and a uniform first trench is disposed between the adjacent first silicon dioxide layer units; the second silicon dioxide layer includes multiple second silicon dioxide layer units, the second silicon dioxide layer units correspondingly cover surfaces of the first silicon dioxide layer units, and the first silicon dioxide layer units and the second silicon dioxide layer units are included in the first ridge silicon dioxide waveguide layer; and the first silicon waveguide layer includes multiple first silicon waveguide layer units, and the first silicon waveguide layer units correspondingly cover surfaces of the second silicon dioxide layer units.

Correspondingly in a second aspect, a production method for producing a waveguide structure is further provided, including the following steps:

providing a first silicon-on-insulator wafer;

producing the first silicon waveguide layer on a surface of the first silicon-on-insulator wafer;

producing, on the surface of the first silicon-on-insulator wafer, the first ridge silicon dioxide waveguide layer that includes the first silicon dioxide layer and the second silicon dioxide layer;

producing the first trench on the surface of the first silicon-on-insulator wafer to shape the first silicon dioxide layer units; and shaping the second silicon substrate layer into the first air layer to obtain the waveguide structure by means of production.

According to a third aspect, a waveguide structure is provided, where the waveguide structure is applied to a straight waveguide part of an arrayed waveguide in a silicon-on-insulator-based arrayed waveguide grating, the waveguide structure includes two axisymmetrically disposed first ends, and the first end is divided into a first region, a second region, and a third region in a direction toward an axis of symmetry; the waveguide structure includes a third silicon substrate layer, a third silicon dioxide layer, a second silicon waveguide layer, a first waveguide layer, and a second waveguide layer that are sequentially disposed; and a coverage area of the second silicon waveguide layer is less than a coverage area of the third silicon dioxide layer, the second silicon waveguide layer is partially buried in the first waveguide layer, a coverage area of the first waveguide layer is greater than a coverage area of the second waveguide layer, and refractive indexes of the first waveguide layer and the second waveguide layer both lie between a refractive index of the second silicon waveguide layer and a refractive index of the third silicon dioxide layer;

in the first region, the third silicon substrate layer, the third silicon dioxide layer, and the second silicon waveguide layer are sequentially disposed; a width of the second silicon waveguide layer is constant; and the optical signal is transmitted at the second silicon waveguide layer;

in the second region, the third silicon substrate layer, the third silicon dioxide layer, the second silicon waveguide layer, the first waveguide layer, and the second waveguide layer are sequentially disposed; a width of the second silicon waveguide layer gradually decreases in the direction toward the axis of symmetry; and the optical signal is gradually transmitted from the second silicon waveguide layer to a ridge waveguide layer that includes the first waveguide layer and the second waveguide layer; and in the third region, the third silicon substrate layer, the third silicon dioxide layer, the first waveguide layer, and the second waveguide layer are sequentially disposed; a width of the second silicon waveguide layer is decreased to 0; and the optical signal is transmitted at the ridge waveguide layer that includes the first waveguide layer and the second waveguide layer.

With reference to the second aspect, in a first possible implementation manner, the first waveguide layer includes multiple parallel first waveguide layer units that are arrayed at intervals, the second waveguide layer includes multiple second waveguide layer units, the second waveguide layer units correspondingly cover surfaces of the first waveguide layer units, and the first waveguide layer units and the second waveguide layer units are included in the ridge waveguide layer; and the second silicon waveguide layer includes multiple second silicon waveguide layer units, and the second silicon waveguide layer units are correspondingly buried in the first waveguide layer units.

In a second possible implementation manner, materials of the first waveguide layer and the second waveguide layer are the same, and are both silicon nitride or polymethyl methacrylate.

Correspondingly, a production method for producing the waveguide structure is provided. The method includes the following steps:

providing a second silicon-on-insulator wafer;

producing the second silicon waveguide layer on a surface of the second silicon-on-insulator wafer;

producing the first waveguide layer and the second waveguide layer on the surface of the second silicon-on-insulator wafer; and producing the ridge waveguide layer that includes the first waveguide layer and the second waveguide layer.

According to a third aspect, a waveguide coupling structure is provided, where the waveguide coupling structure is used in a spot-size converter that couples a silicon waveguide to a laser source; the waveguide coupling structure is divided into a first region, a second region, and a third region in a direction toward the laser source; and the waveguide coupling structure includes a fourth silicon substrate layer, a fifth silicon substrate layer, a fourth silicon dioxide layer, a fifth silicon dioxide layer, and a third silicon waveguide layer;

in the first region, the fourth silicon substrate layer, the fifth silicon substrate layer, the fourth silicon dioxide layer, the fifth silicon dioxide layer, and the third silicon waveguide layer are sequentially disposed; a width of the third silicon waveguide layer is constant; and the optical signal is transmitted at the third silicon waveguide layer;

in the second region, the fifth silicon substrate layer is etched as a second air layer; the fourth silicon substrate layer, the second air layer, the fourth silicon dioxide layer, the fifth silicon dioxide layer, and the third silicon waveguide layer are sequentially disposed; a width of the third silicon waveguide layer gradually decreases in the direction toward the laser source; and the optical signal is gradually transmitted from the third silicon waveguide layer to a second ridge silicon dioxide waveguide layer that includes the fourth silicon dioxide layer and the fifth silicon dioxide layer;

in the third region, the fourth silicon substrate layer, the second air layer, the fourth silicon dioxide layer, and the fifth silicon dioxide layer are sequentially disposed; a width of the third silicon waveguide layer is decreased to 0; and the optical signal is transmitted at the second ridge silicon dioxide waveguide layer that includes the fourth silicon dioxide layer and the fifth silicon dioxide layer; and the third region is used for coupling to the laser.

Correspondingly, a production method for producing the waveguide coupling structure is provided. The method includes the following steps:

providing a third silicon-on-insulator wafer;

producing the third silicon waveguide layer on a surface of the third silicon-on-insulator wafer;

producing, on the surface of the third silicon-on-insulator wafer, the second ridge silicon dioxide waveguide layer that includes the fourth silicon dioxide layer and the fifth silicon dioxide layer; and shaping the fifth silicon substrate layer into the second air layer to obtain the waveguide coupling structure by means of production.

According to a fourth aspect, a waveguide structure is provided, where the waveguide structure is applied to a straight waveguide part of an arrayed waveguide in a silicon-on-insulator-based arrayed waveguide grating; the waveguide structure includes two axisymmetrically disposed first ends, and the first end is sequentially divided into a first region, a second region, and a third region in a direction toward an axis of symmetry; and the waveguide structure includes a sixth silicon substrate layer, a seventh silicon substrate layer, a sixth silicon dioxide layer, a fourth silicon waveguide layer, a doped silicon dioxide layer, and a seventh silicon dioxide layer;

in the first region, the sixth silicon substrate layer, the seventh silicon substrate layer, the sixth silicon dioxide layer, and the fourth silicon waveguide layer are sequentially disposed; a width of the fourth silicon waveguide layer is a constant value; the width of the fourth silicon waveguide layer is less than a width of the seventh silicon substrate layer; and an optical signal is transmitted at the fourth silicon waveguide layer;

in the second region, the sixth silicon substrate layer, the seventh silicon substrate layer, the sixth silicon dioxide layer, and the fourth silicon waveguide layer are sequentially disposed; and a width of the fourth silicon waveguide layer gradually decreases in the direction toward the axis of symmetry;

in the third region, the seventh silicon substrate layer and the sixth silicon dioxide layer are etched as a third air layer, and a width of the fourth silicon waveguide layer is 0;

the seventh silicon dioxide layer covers surfaces of the fourth silicon waveguide layer and the sixth silicon dioxide layer in the first region, covers surfaces of the fourth silicon waveguide layer and the sixth silicon dioxide layer in the second region, and is further padded into the third air layer in the third region, and a thickness of the seventh silicon dioxide layer is less than or equal to a thickness of the seventh silicon substrate layer in the third region;

the doped silicon dioxide layer covers a surface of the seventh silicon dioxide layer in the third region, a coverage area of the doped silicon dioxide layer is less than a coverage area of the seventh silicon dioxide layer, and the doped silicon dioxide layer is corresponding to the fourth silicon waveguide layer; and in the second region, the optical signal is gradually transmitted from the fourth silicon waveguide layer to a silicon dioxide waveguide layer that includes the sixth silicon dioxide layer and the seventh silicon dioxide layer; and in the third region, the optical signal is transmitted at the doped silicon dioxide layer.

In a first possible implementation manner, the doped silicon dioxide layer includes multiple parallel doped silicon dioxide layer units that are arrayed at intervals, and a second trench is disposed between the adjacent doped silicon dioxide layer units.

With reference to the first possible implementation manner, in a second possible implementation manner, the waveguide structure further includes an eighth silicon dioxide layer, the eighth silicon dioxide layer covers the seventh silicon dioxide layer in the first region and the second region, and the eighth silicon dioxide layer covers the second trench in the third region.

Correspondingly, a method for producing the foregoing waveguide structure is provided. The method includes the following steps:

providing a fourth silicon-on-insulator wafer;

producing the fourth silicon waveguide layer on a surface of the fourth silicon-on-insulator wafer;

producing the seventh silicon substrate layer and the sixth silicon dioxide layer on a surface of the third region to shape a trench-shaped air layer;

producing the seventh silicon dioxide layer in the first region, the second region, and the third region; and producing a doped silicon dioxide layer on the surface of the third region.

In a first possible implementation manner, after the step of producing a doped silicon dioxide layer on the surface of the third region by using a deposition method, the method further includes a step of: etching on a surface of the silicon dioxide doped layer to shape the second trench.

With reference to the first possible implementation manner, in a second possible implementation manner, after a step of etching on a surface of the doped silicon dioxide layer to shape the second trench, the method further includes a step of: producing the eighth silicon dioxide layer.

In conclusion, the waveguide structure and the waveguide coupling structure that are provided in the present invention have advantages of a small size, low polarization dependence, and low temperature sensitivity, and a crosstalk value is greater than 25 dB, which meets a requirement of a passive optical network system, and provides feasibility for commercialization of an arrayed waveguide grating.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
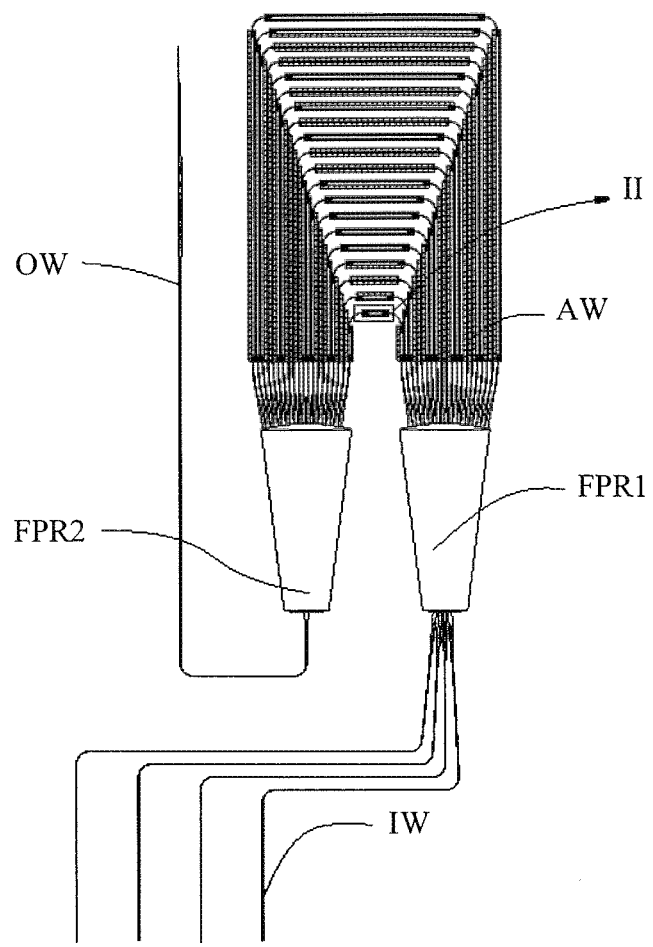
FIG. 1 is a schematic structural diagram of an arrayed waveguide grating according to the present invention.
Figure 2:
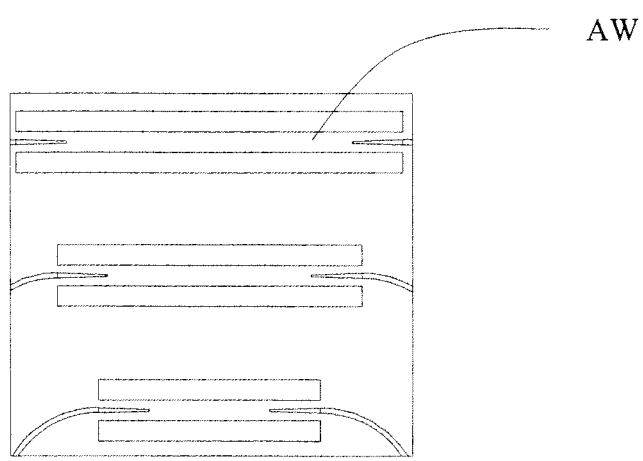
FIG. 2 is a partially enlarged schematic diagram of part II shown in FIG. 1.

Referring to FIG. 1, a structure of an arrayed waveguide grating provided in the present invention is roughly the same as that of a common arrayed waveguide grating, and the arrayed waveguide grating provided in the present invention includes an input waveguide IW, an input free propagation region (FPR1), an arrayed waveguide AW, an output planar waveguide region FPR2, and an output waveguide OW. A difference lies in the arrayed waveguide AW. Referring to FIG. 2, FIG. 2 is an enlarged schematic diagram of the arrayed waveguide AW.

In the present invention, silicon dioxide in a silicon-on-insulator (silicon on insulator, SOI for short) wafer is used as a straight waveguide part of the arrayed waveguide AW, and a phase difference generated from the straight waveguide part is a main factor that determines an operating wavelength of the arrayed waveguide grating. The following are specific embodiments.

Embodiment 1

Figure 3:
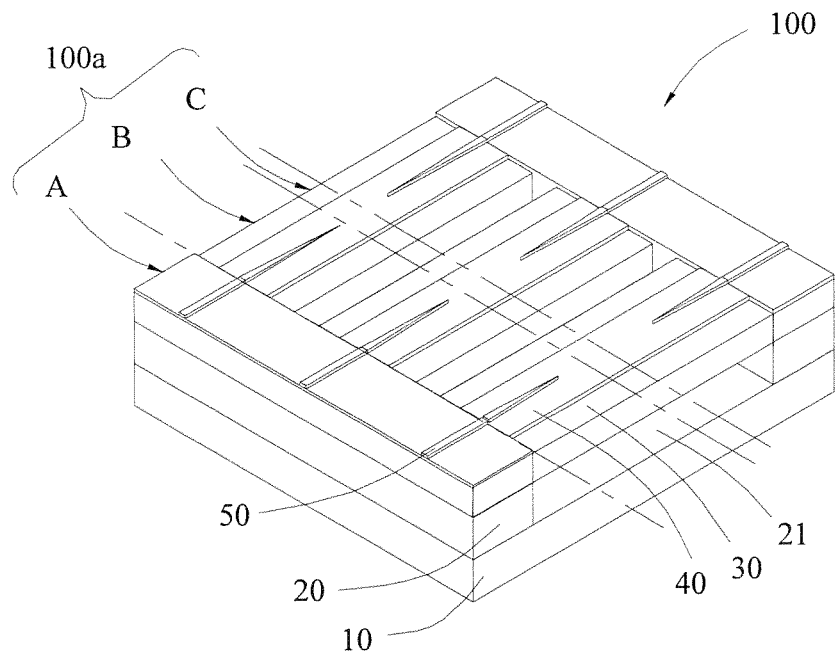
FIG. 3 and FIG. 7 are schematic diagrams of a waveguide structure according to Embodiment 1 of the present invention.

Referring to FIG. 3, FIG. 3 is a schematic diagram of a waveguide structure 100 according to the present invention. The waveguide structure is of a protruding type, and the waveguide structure is applied to a straight waveguide part of an arrayed waveguide AW in an SOI-based arrayed waveguide grating. In the waveguide structure 100, silicon dioxide in an SOI wafer is used as bottom cladding.

The waveguide structure 100 includes two axisymmetrically disposed first ends 100a. The first end 100a is sequentially divided into a first region A, a second region B, and a third region C in a direction toward an axis of symmetry. The waveguide structure 100 includes a first silicon substrate layer 10, a second silicon substrate layer 20, a first silicon dioxide layer 30, a second silicon dioxide layer 40, and a first silicon waveguide layer 50.

Figure 4:
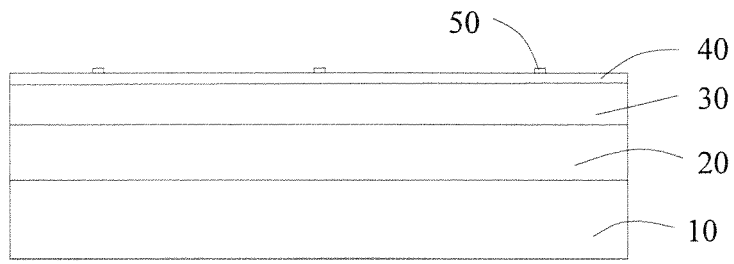
FIG. 4 is a cross-section diagram of a first region shown in FIG. 3.

Comprehensively referring to FIG. 3 and FIG. 4, in the first region A, the first silicon substrate layer 10, the second silicon substrate layer 20, the first silicon dioxide layer 30, the second silicon dioxide layer 40, and the first silicon waveguide layer 50 are sequentially disposed. The first silicon waveguide layer 50 is exposed to air, a width of the first silicon waveguide layer 50 is a constant value, a refractive index of the first silicon waveguide layer 50 is greater than refractive indexes of the air and the second silicon dioxide layer 40, and the refractive index of the first silicon waveguide layer 50 is relatively the largest; therefore, when an optical signal is input to the first silicon waveguide layer 50 in the first region A, the optical signal is transmitted only at the first silicon waveguide layer 50.

Figure 5:
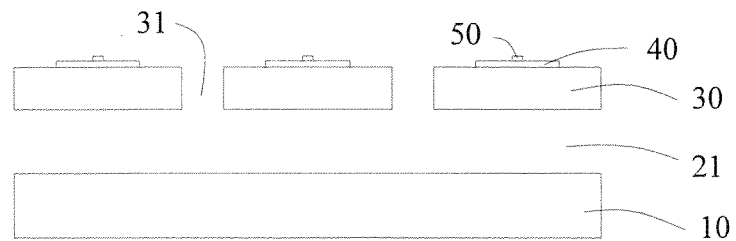
FIG. 5 is a cross-section diagram of a second region shown in FIG. 3.

Comprehensively referring to FIG. 3 and FIG. 5, in the second region B, the second silicon substrate layer 20 is etched as a first air layer 21, and the first silicon substrate layer 10, the first air layer 21, the first silicon dioxide layer 30, the second silicon dioxide layer 40, and the first silicon waveguide layer 50 are sequentially disposed. In addition, a width of the first silicon waveguide layer 50 gradually decreases in the direction toward the axis of symmetry, so that, gradually, the first silicon waveguide layer 50 no longer has a capability of limiting light beam transmission. Therefore, when the optical signal is input to the first silicon waveguide layer 50 in the second region B, the optical signal is gradually transmitted from the first silicon waveguide layer 50 to a first ridge silicon dioxide waveguide layer that includes the first silicon dioxide layer 30 and the second silicon dioxide layer 40. In this embodiment, the width of the first silicon waveguide layer 50 gradually decreases in the direction toward the axis of symmetry, which is favorable for implementing a slow change of the first silicon waveguide layer 50 from the first region A to the third region C via the second region B, so that a loss generated because of transformation of a propagation mode of the optical signal is reduced.

Figure 6:
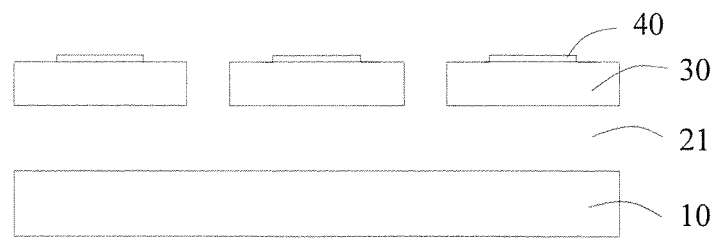
FIG. 6 is a cross-section diagram of a third region shown in FIG. 3.

Comprehensively referring to FIG. 3 and FIG. 6, in the third region C, the second silicon substrate layer 20 is etched as the first air layer 21, and the first silicon substrate layer 10, the first air layer 21, the first silicon dioxide layer 30, and the second silicon dioxide layer 40 are sequentially disposed. a width of the first silicon waveguide layer 50 is 0, and the optical signal is transmitted at the first ridge silicon dioxide waveguide layer that includes the first silicon dioxide layer 30 and the second silicon dioxide layer 40.

In the second region B and the third region C, the first air layer 21 is used as bottom cladding of the first ridge silicon dioxide waveguide layer, and no other material needs to be padded into the first air layer 21, which simplifies a production process. A structure of the first ridge silicon dioxide waveguide layer may reduce a limitation on a light field, so that a random phase error caused by a process error is reduced, and a crosstalk value of the device is increased. In addition, the first ridge silicon dioxide waveguide layer has characteristics of a low temperature coefficient and low polarization dependence; therefore, the waveguide structure 100 also has the characteristics.

Optical transmission is reversible in the waveguide structure 100. Therefore, optical transmission principles of the two first ends 100a are also the same.

Therefore, in the waveguide structure 100 provided in Embodiment 1 of the present invention, when the optical signal is input from the first region A, the optical signal is transmitted at the first silicon waveguide layer 50 in the first region A. When the optical signal enters the second region B, the optical signal is gradually transmitted from the first silicon waveguide layer 50 to the first ridge silicon dioxide waveguide layer that includes the first silicon dioxide layer 30 and the second silicon dioxide layer 40. When the optical signal enters the third region C, the optical signal is completely transmitted at the first ridge silicon dioxide waveguide layer, and is then transmitted to the other first end 100a, thereby outputting the optical signal.

Figure 7:
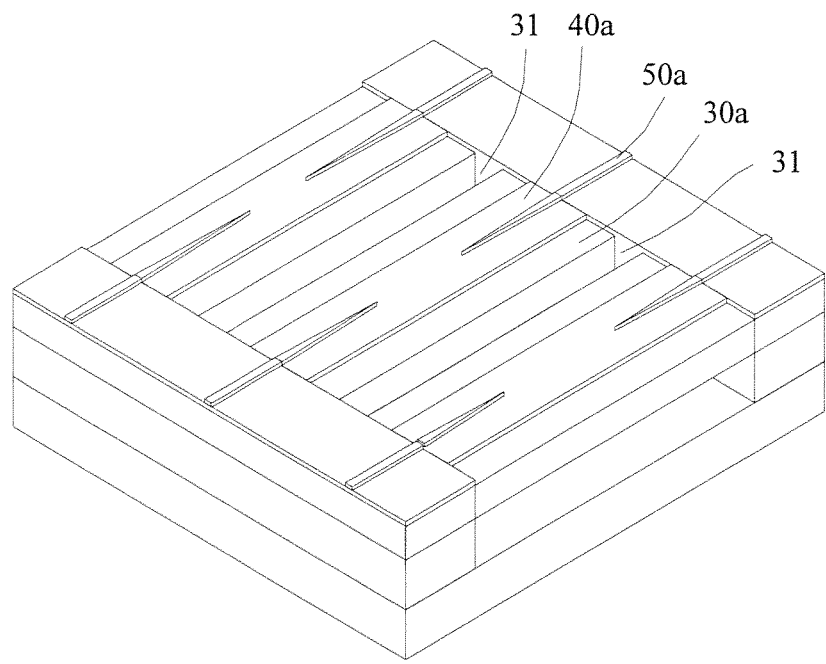

In addition, referring to FIG. 7, to increase a quantity of paths of the arrayed waveguide AW, in this implementation manner, the used first silicon dioxide layer 30 includes multiple parallel first silicon dioxide layer units 30a that are arrayed at intervals, and a first trench 31 is disposed between the adjacent first silicon dioxide layer units 30a. The second silicon dioxide layer 40 includes multiple second silicon dioxide layer units 40a, the second silicon dioxide layer units 40a correspondingly cover surfaces of the first silicon dioxide layer units 30a, and the first silicon dioxide layer units 30a and the second silicon dioxide layer units 40a are included in the first ridge silicon dioxide waveguide layer. The first silicon waveguide layer 50 includes multiple first silicon waveguide layer units 50a, and the first silicon waveguide layer units 50a correspondingly cover surfaces of the second silicon dioxide layer units 40a.

In another implementation manner, the first silicon dioxide layer 30 may include only one first silicon dioxide layer unit 30a. Correspondingly, the second silicon dioxide layer 40 includes only one second silicon dioxide layer unit 40a, and the first silicon waveguide layer 50 includes only one first silicon waveguide layer unit 50a.

In addition, the present invention further provides a production method for producing the waveguide structure 100. The method includes the following steps:

S11. Provide a first SOI wafer, where the first SOI wafer is a common SOI wafer, and regarding a structure of the first SOI wafer, a silicon dioxide layer is disposed between two silicon layers.

S12. Produce the first silicon waveguide layer 50 on a surface of the first SOI wafer by means of dry etching. In another implementation manner, the first silicon waveguide layer 50 may be produced by using another etching method, for example, wet etching. In the following steps, dry etching may also be replaced with wet etching.

S13. Produce, on the surface of the first SOI wafer by means of dry etching, the first ridge silicon dioxide waveguide layer that includes the first silicon dioxide layer 30 and the second silicon dioxide layer 40.

S14. Produce, by means of dry etching, the first trench 31 on the surface of the first SOI wafer to shape the first silicon dioxide layer units 30a.

S15. Shape, by means of wet etching, the second silicon substrate layer 20 into the first air layer 21 to obtain the waveguide structure 100 by means of production.

Embodiment 2

Figure 8:
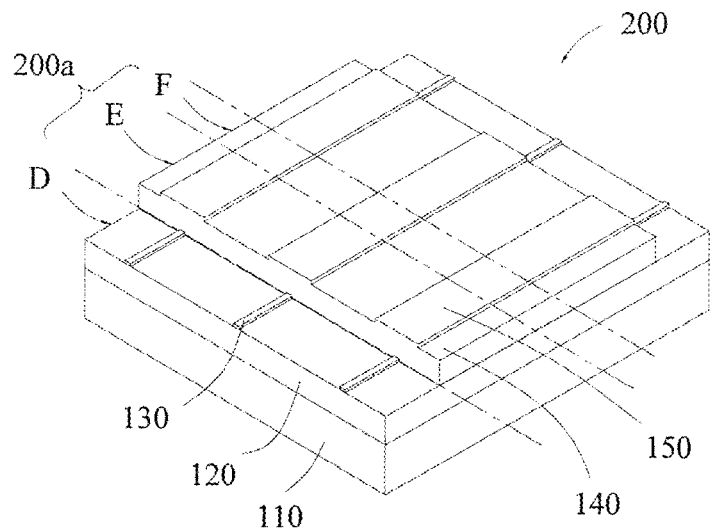
FIG. 8 and FIG. 12 are schematic diagrams of a waveguide structure according to Embodiment 2 of the present invention.

Referring to FIG. 8, FIG. 8 is a schematic structural diagram of a waveguide structure 200 according to the present invention. The waveguide structure 200 is of a buried type, and the waveguide structure 200 is applied to a straight waveguide part of an arrayed waveguide AW in an SOI-based arrayed waveguide grating. The waveguide structure 200 uses a structure in which a waveguide layer with a low refractive index is added to a silicon optical surface.

The waveguide structure 200 includes two axisymmetrically disposed first ends 200a. The first end 200a is divided into a first region D, a second region E, and a third region F in a direction toward an axis of symmetry. The waveguide structure 200 includes a third silicon substrate layer 110, a third silicon dioxide layer 120, a second silicon waveguide layer 130, a first waveguide layer 140, and a second waveguide layer 150 that are sequentially disposed. A coverage area of the second silicon waveguide layer 130 is less than a coverage area of the third silicon dioxide layer 120, and the second silicon waveguide layer 130 is partially buried in the first waveguide layer 140. A coverage area of the first waveguide layer 140 is greater than a coverage area of the second waveguide layer 150, and refractive indexes of the first waveguide layer 140 and the second waveguide layer 150 both lie between a refractive index of the second silicon waveguide layer 130 and a refractive index of the third silicon dioxide layer 120.

Figure 9:
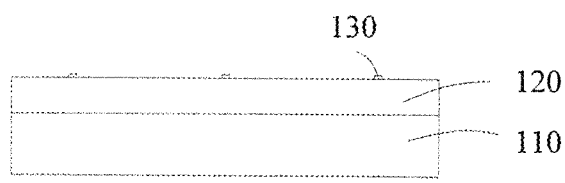
FIG. 9 is a cross-section diagram of a first region shown in FIG. 8.

Referring to FIG. 8 and FIG. 9, in the first region D, the third silicon substrate layer 110, the third silicon dioxide layer 120, and the second silicon waveguide layer 130 are sequentially disposed. The second silicon waveguide layer 130 is exposed to air, a width of the second silicon waveguide layer 130 is constant, and the refractive index of the second silicon waveguide layer 130 is relatively large; therefore, the optical signal is transmitted at the second silicon waveguide layer 130.

Figure 10:
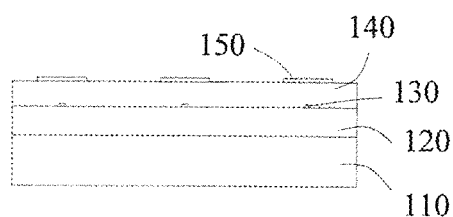
FIG. 10 is a cross-section diagram of a second region shown in FIG. 8.

Referring to FIG. 8 and FIG. 10, in the second region E, the third silicon substrate layer 110, the third silicon dioxide layer 120, the second silicon waveguide layer 130, the first waveguide layer 140, and the second waveguide layer 150 are sequentially disposed. A width of the second silicon waveguide layer 130 gradually decreases in the direction toward the axis of symmetry, so that, gradually, the second silicon waveguide layer 130 no longer has a capability of limiting light beam transmission. Therefore, the optical signal is gradually transmitted from the second silicon waveguide layer 130 to a ridge waveguide layer that includes the first waveguide layer 140 and the second waveguide layer 150. In this embodiment, the width of the second silicon waveguide layer 130 gradually decreases in the direction toward the axis of symmetry, which is favorable for implementing a slow change of the second silicon waveguide layer 130 from the first region D to the third region F via the second region E, so that a loss generated because of transformation of a propagation mode of the optical signal is reduced.

Figure 11:
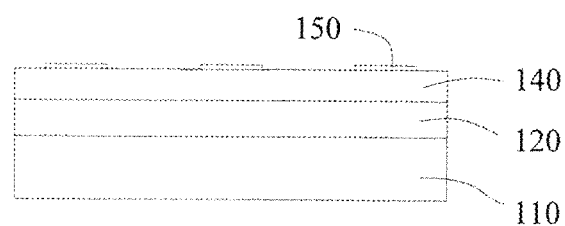
FIG. 11 is a cross-section diagram of a third region shown in FIG. 8.

Referring to FIG. 8 and FIG. 11, in the third region F, the third silicon substrate layer 110, the third silicon dioxide layer 120, the first waveguide layer 140, and the second waveguide layer 150 are sequentially disposed. A width of the second silicon waveguide layer 130 is decreased to 0, and the optical signal is transmitted at the ridge waveguide layer that includes the first waveguide layer 140 and the second waveguide layer 150.

Optical transmission is reversible in the waveguide structure 200. Therefore, optical transmission principles of the two first ends 200*a* are also the same.

An optical transmission principle of the waveguide structure 200 in Embodiment 2 of the present invention is roughly the same as an optical transmission principle of the waveguide structure 100 in Embodiment 1. In the second region E and the third region F, a structure of the ridge waveguide layer may reduce a limitation on a light field, so that a random phase change caused by a process error is reduced, and a crosstalk value of the device is increased. In addition, the ridge waveguide layer has characteristics of a low temperature coefficient and low polarization dependence; therefore, the waveguide structure 200 also has the characteristics.

Figure 12:
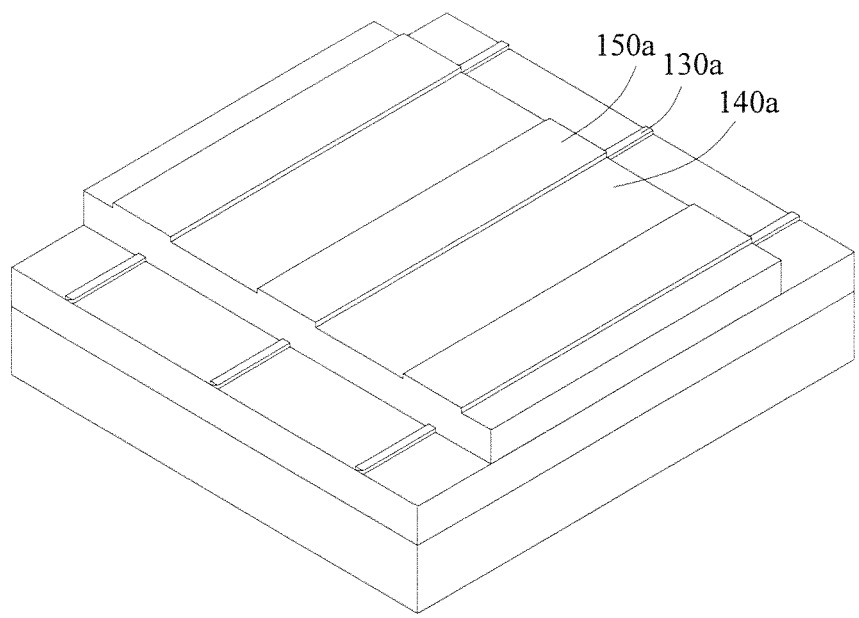

In addition, referring to FIG. 12, to increase a quantity of paths of the arrayed waveguide AW, in this implementation manner, the first waveguide layer 140 includes multiple parallel first waveguide layer units 140*a* that are arrayed at intervals, the second waveguide layer 150 includes multiple second waveguide layer units 150*a*, the second waveguide layer units 150*a* correspondingly cover surfaces of the first waveguide layer units 140*a*, and the first waveguide layer units 140*a* and the second waveguide layer units 150*a* are included in the ridge waveguide layer. The second silicon waveguide layer 130 includes multiple second silicon waveguide layer units 130*a*, and the second silicon waveguide layer units 130*a* are correspondingly buried in the first waveguide layer units 140*a*.

In another implementation manner, the first waveguide layer 140 may include only one first waveguide layer unit 140*a*. Correspondingly, the second waveguide layer 150 may also include only one second waveguide layer unit 150*a*, and the second silicon waveguide layer 130 may include only one second silicon waveguide layer unit 130*a*.

Materials of the first waveguide layer 140 and the second waveguide layer 150 are of a same type, and the refractive indexes of the first waveguide layer 140 and the second waveguide layer 150 both lie between the refractive indexes of the second silicon waveguide layer 130 and the third silicon dioxide layer 120, which is favorable for transmitting the optical signal at the second silicon waveguide layer 130. In this implementation manner, the materials of the first waveguide layer 140 and the second waveguide layer 150 are the same, and are both silicon nitride. In another implementation manner, the materials of the first waveguide layer 140 and the second waveguide layer 150 may both be polymethyl methacrylate.

In addition, the present invention further provides a production method for producing the waveguide structure 200. The method includes the following steps:

S21. Provide a second SOI wafer, where a structure of the second SOI wafer is the same as that of a common SOI wafer: a silicon dioxide layer is disposed between two silicon layers.

S22. Produce the second silicon waveguide layer 130 on a surface of the second SOI wafer by means of dry etching. Dry etching may also be replaced with wet etching, which is also the same in the following step. Details are not described herein again.

S23. Produce the first waveguide layer 140 and the second waveguide layer 150 on the surface of the second SOI wafer by using a deposition method.

S24. Produce, by means of dry etching, the ridge waveguide layer that includes the first waveguide layer 140 and the second waveguide layer 150.

Embodiment 3

Figure 13:
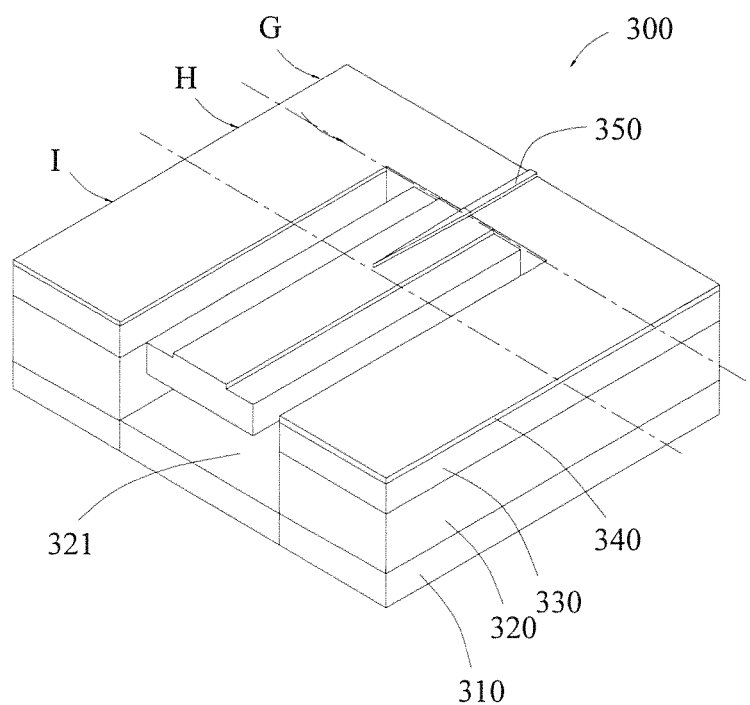
FIG. 13 is a schematic diagram of a waveguide coupling structure according to Embodiment 3 of the present invention.

Referring to FIG. 13, the present invention further discloses a waveguide coupling structure 300 to which the waveguide structure 100 provided in Embodiment 1 is applied. The waveguide coupling structure is used in a spot-size converter that couples a silicon waveguide to a laser source. A structure of the waveguide coupling structure 300 in this embodiment is roughly the same as a structure of the waveguide structure 100 in Embodiment 1, and a difference between the two structures lies in that the waveguide coupling structure 300 is only a half structure of the waveguide structure 100. In addition, the third region I is coupled to the laser source.

The waveguide coupling structure 300 is divided into a first region G, a second region H, and the third region I in a direction toward the laser source. The waveguide coupling structure 300 includes a fourth silicon substrate layer 310, a fifth silicon substrate layer 320, a fourth silicon dioxide layer 330, a fifth silicon dioxide layer 340, and a third silicon waveguide layer 350.

In the first region G, the fourth silicon substrate layer 310, the fifth silicon substrate layer 320, the fourth silicon dioxide layer 330, the fifth silicon dioxide layer 340, and the third silicon waveguide layer 350 are sequentially disposed; a width of the third silicon waveguide layer 350 is constant; and the optical signal is transmitted at the third silicon waveguide layer 350.

In the second region H, the fifth silicon substrate layer 320 is etched as a second air layer 321; the fourth silicon substrate layer 310, the second air layer 321, the fourth silicon dioxide layer 330, the fifth silicon dioxide layer 340, and the third silicon waveguide layer 350 are sequentially disposed; a width of the third silicon waveguide layer 350 gradually decreases in the direction toward the laser source; and the optical signal is gradually transmitted from the third silicon waveguide layer 350 to a second ridge silicon dioxide waveguide layer that includes the fourth silicon dioxide layer 330 and the fifth silicon dioxide layer 340.

In the third region I, the fourth silicon substrate layer 310, the second air layer 321, the fourth silicon dioxide layer 330, and the fifth silicon dioxide layer 340 are sequentially disposed; a width of the third silicon waveguide layer 350 is decreased to 0; and the optical signal is transmitted at the second ridge silicon dioxide waveguide layer that includes the fourth silicon dioxide layer 330 and the fifth silicon dioxide layer 340. The third region I is used for coupling to the laser. The third region I is used for coupling to the laser source.

The present invention further provides a method for producing the waveguide coupling structure 300. The method includes the following steps:

S31. Provide a third SOI wafer.

S32. Produce the third silicon waveguide layer 350 on a surface of the third SOI wafer by means of dry etching. In another implementation manner, dry etching may be replaced with wet etching to produce the third silicon waveguide layer 350. Dry etching in the following step may also be replaced with wet etching, and details are not described herein again.

S33. Produce, on the surface of the third SOI wafer by means of dry etching, the second ridge silicon dioxide waveguide layer that includes the fourth silicon dioxide layer 330 and the fifth silicon dioxide layer 340.

S34. Shape, by means of wet etching, the fifth silicon substrate layer 320 into the second air layer 321 to obtain the waveguide coupling structure 300 by means of production.

An optical signal transmission principle of the waveguide coupling structure 300 provided in Embodiment 3 of the present invention is roughly the same as an optical signal transmission principle of the waveguide structure 100 in Embodiment 1. When the waveguide coupling structure 300 provided in the present invention is coupled to the laser source, a coupling loss may be controlled to be less than 0.5 dB, and the loss is relatively low, which lays the foundation for work without an optical amplifier.

Embodiment 4

Figure 14:
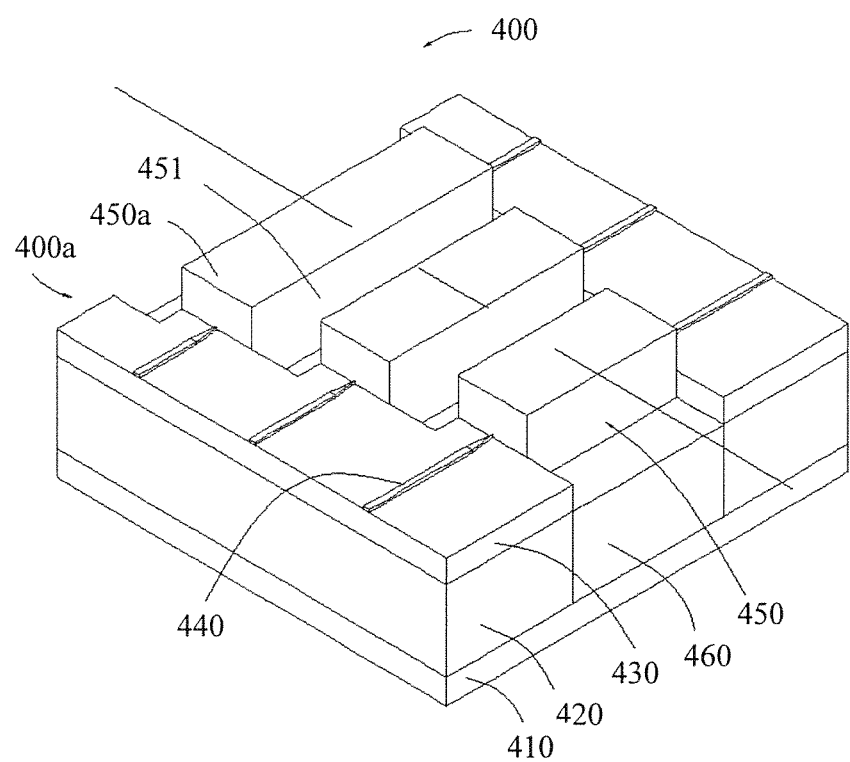
FIG. 14 is a partial cross-section diagram of a waveguide structure according to Embodiment 4 of the present invention.

Referring to FIG. 14, FIG. 14 is a schematic structural diagram of a waveguide structure 400 according to the present invention. The waveguide structure 400 is of a redeposited type, and the waveguide structure 400 is applied to a straight waveguide part of an arrayed waveguide AW in an SOI-based arrayed waveguide grating.

The waveguide structure 400 includes two axisymmetrically disposed first ends 400a, where the first end 400a is sequentially divided into a first region (not shown in the figure), a second region (not shown in the figure), and a third region (not shown in the figure) in a direction toward an axis of symmetry. The waveguide structure 400 includes a sixth silicon substrate layer 410, a seventh silicon substrate layer 420, a sixth silicon dioxide layer 430, a fourth silicon waveguide layer 440, a doped silicon dioxide layer 450, and a seventh silicon dioxide layer 460.

In the first region, the sixth silicon substrate layer 410, the seventh silicon substrate layer 420, the sixth silicon dioxide layer 430, and the fourth silicon waveguide layer 440 are sequentially disposed; a width of the fourth silicon waveguide layer 440 is a constant value; the width of the fourth silicon waveguide layer 440 is less than a width of the seventh silicon substrate layer 420; and an optical signal is transmitted at the fourth silicon waveguide layer 440.

In the second region, the sixth silicon substrate layer 410, the seventh silicon substrate layer 420, the sixth silicon dioxide layer 430, and the fourth silicon waveguide layer 440 are sequentially disposed; and a width of the fourth silicon waveguide layer 440 gradually decreases in the direction toward the axis of symmetry. In this embodiment, the width of the fourth silicon waveguide layer 440 gradually decreases in the direction toward the axis of symmetry, which is favorable for implementing a slow change of the fourth silicon waveguide layer 440 from the first region to the third region via the second region, so that a loss generated because of transformation of a propagation mode of the optical signal is reduced.

In the third region, the seventh silicon substrate layer 420 and the sixth silicon dioxide layer 430 are etched as a third air layer, and a width of the fourth silicon waveguide layer 440 is 0.

Figure 15:
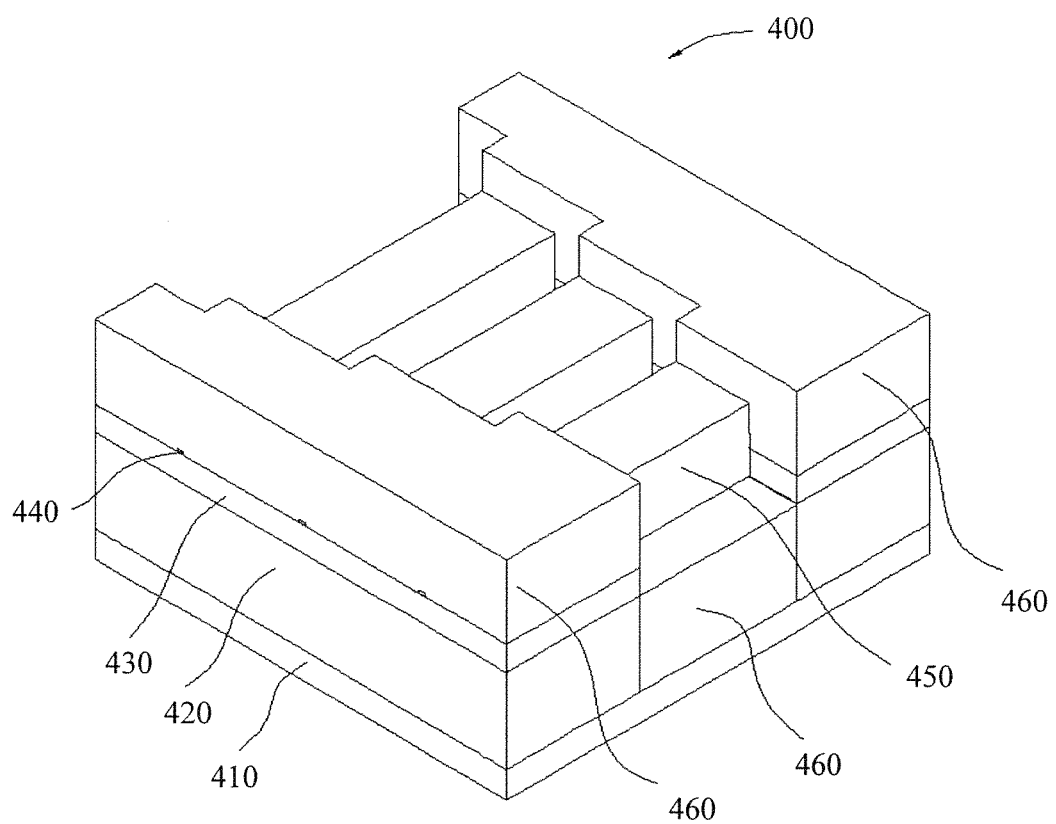
FIG. 15 is a schematic structural diagram of a seventh silicon dioxide layer that covers a surface of the waveguide structure shown in FIG. 14.

Referring to FIG. 15, the seventh silicon dioxide layer 460 covers surfaces of the fourth silicon waveguide layer 440 and the sixth silicon dioxide layer 430 in the first region, covers surfaces of the fourth silicon waveguide layer 440 and the sixth silicon dioxide layer 430 in the second region, and is further padded into the third air layer in the third region, and a thickness of the seventh silicon dioxide layer 460 is less than or equal to a thickness of the seventh silicon substrate layer 420 in the third region. The seventh silicon dioxide layer 460 is mainly used for padding the third air layer.

The doped silicon dioxide layer 450 covers a surface of the seventh silicon dioxide layer 460 in the third region, and a coverage area of the doped silicon dioxide layer 450 is less than a coverage area of the seventh silicon dioxide layer 460. The doped silicon dioxide layer 450 is corresponding to the fourth silicon waveguide layer 440, which is favorable for transmitting the optical signal between the doped silicon dioxide layer 450 and the fourth silicon waveguide layer 440.

In the second region, the optical signal is gradually transmitted from the fourth silicon waveguide layer 440 to a silicon dioxide waveguide layer that includes the sixth silicon dioxide layer 430 and the seventh silicon dioxide layer 460; and in the third region, the optical signal is transmitted at the doped silicon dioxide layer 450.

The use of a structure of the doped silicon dioxide layer 450 in this embodiment reduces a limitation on a light field, reduces a random phase change caused by a process error, and increases a crosstalk value of the device. In addition, the doped silicon dioxide layer 450 has characteristics of a low temperature coefficient and low polarization dependence; therefore, the waveguide structure 400 also has the characteristics.

The doped silicon dioxide layer 450 includes multiple parallel doped silicon dioxide layer units 450a that are arrayed at intervals, and a second trench 451 is disposed between the adjacent doped silicon dioxide layer units 450a. The second trench 451 is used to shape a core layer structure of the doped silicon dioxide layer 450.

Figure 16:
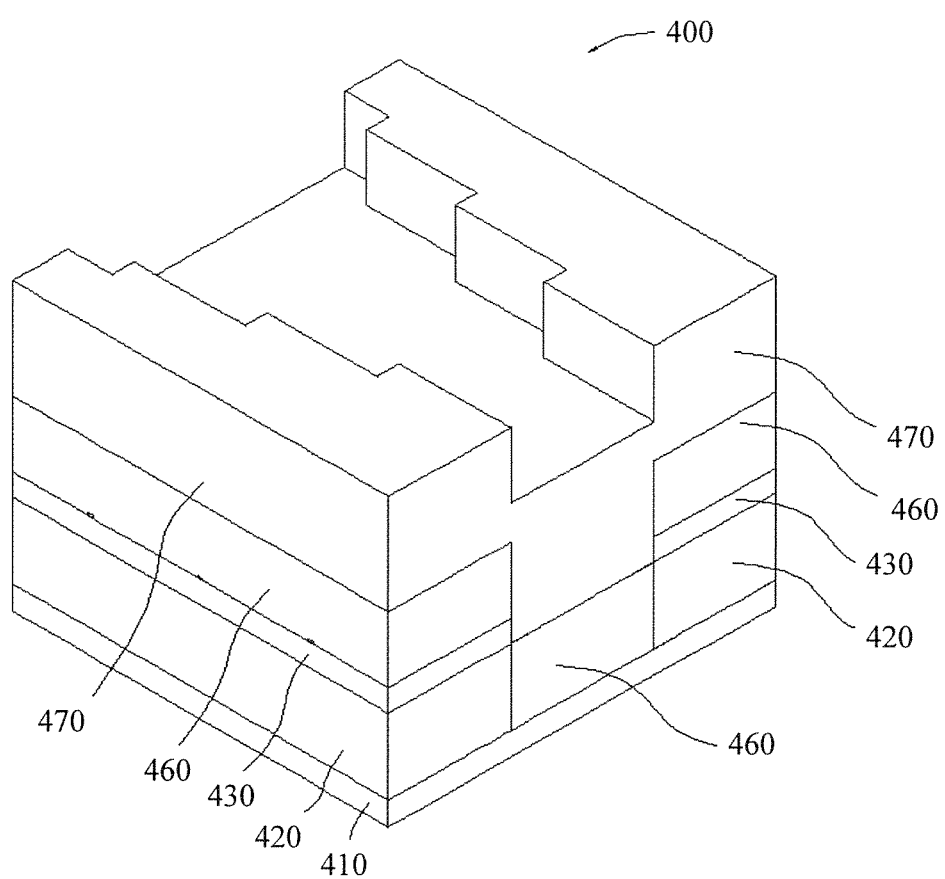
FIG. 16 is a schematic structural diagram of an eighth silicon dioxide layer that covers a surface in FIG. 15.

In addition, referring to FIG. 16, the waveguide structure 400 further includes an eighth silicon dioxide layer 470, the eighth silicon dioxide layer 470 covers the seventh silicon dioxide layer 460 in the first region and the second region, and the eighth silicon dioxide layer 470 covers the second trench in the third region. The eighth silicon dioxide layer 470 is used to reduce a limitation of the doped silicon dioxide layer 450 on the light field.

The present invention further provides a production method for producing the waveguide structure 400. The method includes the following steps:

S41. Provide a fourth SOI wafer.

S42. Produce the fourth silicon waveguide layer 440 on a surface of the fourth SOI wafer by means of dry etching. In another implementation manner, dry etching may be replaced with wet etching to produce the fourth silicon waveguide layer 440. Dry etching in the following step may also be replaced with another method, and details are not described herein again.

S43. Etch the seventh silicon substrate layer 420 and the sixth silicon dioxide layer 430 on a surface of the third region by means of dry etching, to shape the trench-shaped third air layer.

S44. Produce the seventh silicon dioxide layer 460 in the first region, the second region, and the third region by using a deposition method.

S45. Produce the doped silicon dioxide layer 450 on the surface of the third region by using the deposition method.

S46. Etch on a surface of the doped silicon dioxide layer 450 to shape the second trench 451, so as to shape the core layer structure of the doped silicon dioxide layer 450.

S47. Produce the eighth silicon dioxide layer 470 by using the deposition method, so as to reduce the limitation of the doped silicon dioxide layer 450 on the light field.

An optical signal transmission principle of the waveguide structure 400 provided in Embodiment 4 of the present invention is roughly the same as an optical signal transmission principle of the waveguide structure 100 in Embodiment 1, and details are not described herein again.

The following describes, based on data, in detail beneficial effects of the embodiments provided in the present invention.

Theoretically, a waveguide that reduces a limitation on a light field is used to replace a silicon waveguide, and is used as a straight waveguide part of an arrayed waveguide AW, which reduces a change, in an equivalent refractive index of the waveguide, generated because of a waveguide size change caused by a process error, thereby reducing a random phase change experienced by the light field when an optical signal is being propagated in different arrayed waveguides AW. The random phase change experienced by the light field when being propagated in the different arrayed waveguides AW is a primary factor why an actual device cannot achieve a theoretically designed crosstalk value. Therefore, a special structure design of the waveguide reduces this random phase change, and may theoretically increase a crosstalk value of a device.

Actually, an existing empirical formula (1) for estimating a crosstalk value is $$XT \sim 10 \operatorname{Log}\left(\frac{\delta_{nc} \times L_{ctr}}{\lambda}\right)^2.$$

In formula (1), $\delta_{nc}$ represents fluctuation of an average equivalent refractive index Δnc of paths (path-averaged effective index), and $L_{ctr}$ represents an average value of lengths of arrayed waveguides AW. Random changes of waveguide widths and waveguide thicknesses caused by process errors may cause changes in equivalent refractive indexes of waveguides. During calculation, it is considered that a variance of the random changes in the waveguide widths is 1 nm, a corresponding change $\delta_{nc}$ is estimated by means of numerical simulation, and a theoretical crosstalk value of an arrayed waveguide grating is calculated by using formula (1).

TABLE 1

Crosstalk Estimation of an Arrayed Waveguide Grating Including Different Types of Waveguides

| Type of arrayed waveguides | δnc (W) | $L_{ctr}$ | Theoretical XT (W) | Experimental XT |
|---|---|---|---|---|
| Common SOI waveguide (TE): H 0.22 μm, W 0.5 μm | $1.5 \times 10^{-3}$ | 500 μm | −5.96 | −5 to −8 |
| SOI waveguide (TE) in comparative Embodiment 1: H 0.22 μm, W 0.8 μm | $4.3 \times 10^{-4}$ | 500 μm | −17.16 | −18 to −20 |
| Shallow-etched SOI waveguide (TE) in comparative Embodiment 2: H 0.07 μm, W 0.8 μm | $2.3 \times 10^{-4}$ | 500 μm | −22.6 | −18 |
| Common SiO2 waveguide: H 6 μm, W 6 μm | $1 \times 10^{-6}$ | 15000 μm | −40 | −25 to −30 |
| Waveguide structure in Embodiment 1: H 2 μm, h 0.3 μm, W 5 μm | $8.2 \times 10^{-7}$ | <3000 μm | >−56 | — |

Refer to Table 1. 1550 nm is selected as a wavelength for calculation. In silicon-based arrayed waveguide gratings in comparative Embodiment 1 and comparative Embodiment 2, neither theoretical values nor experimental values can meet a requirement of crosstalk of 25 dB. For a common silicon-dioxide-based arrayed waveguide grating, because δne caused by a process error of the common silicon dioxide-based arrayed waveguide grating is quite small, a crosstalk value of at least 25 dB can still be reached although a size of the common silicon dioxide-based arrayed waveguide grating is relatively large. In an arrayed waveguide grating that uses the waveguide structure 100 in Embodiment 1 of the present invention, a theoretically calculated crosstalk value of the arrayed waveguide grating reaches 56 dB, which completely meets a requirement of a crosstalk counter of at least 25 dB, which provides a solution to implementing a higher crosstalk value.

In conclusion, the waveguide structure and the waveguide coupling structure that are provided in the present invention can have advantages of devices that are made from a silicon optical material, silicon dioxide, and a silicon nitride material, and have the following characteristics:

1. The waveguide structure is applied to a straight waveguide part of an arrayed waveguide AW in an arrayed waveguide grating, and a bent waveguide part of the arrayed waveguide AW is retained, where the bent waveguide part is favorable for reducing a device size. Magnitude of the size of the arrayed waveguide grating in the present invention is mm², and the arrayed waveguide grating inherits such advantages of a silicon optical material as a small size and being capable to be integrated with a modulator and a detector, which meets a requirement of device miniaturization.

2. Advantages of low polarization dependence and low temperature sensitivity that are of $SiO_2$ and SiN waveguide materials are inherited, which reduces temperature sensitivity and polarization sensitivity of the arrayed waveguide grating; therefore, no TEC temperature control equipment needs to be used, and power consumption is reduced.

3. A crosstalk value is greater than 25 dB, which meets a system requirement, and provides feasibility for commercialization of the arrayed waveguide grating.

4. It is implemented that a loss value of coupling to the laser source is 0.5 dB, which lays the foundation for work without an optical amplifier.

5. The waveguide structure and the waveguide coupling structure may work in a transverse magnetic mode, and are suitable for a design requirement of an optical splitter.

The foregoing implementation manners are not intended to limit the protection scope of the technical solutions. Any modification, equivalent replacement, and improvement made without departing from the spirit and principle of the foregoing implementation manners shall fall within the protection scope of the technical solutions.

What is claimed is:

1. A waveguide structure for use with a straight waveguide part of an arrayed waveguide in a silicon-on-insulator-based arrayed waveguide grating, the waveguide structure comprising:
   two axisymmetrically disposed first ends each sequentially divided into a first region, a second region, and a third region in a direction toward an axis of symmetry;
   a first silicon substrate layer, a second silicon substrate layer, a first silicon dioxide layer, a second silicon dioxide layer, and a first silicon waveguide layer;
   in the first region, the first silicon substrate layer, the second silicon substrate layer, the first silicon dioxide layer, the second silicon dioxide layer, and the first silicon waveguide layer are sequentially disposed, wherein a width of the first silicon waveguide layer is a constant value and an optical signal is transmitted at the first silicon waveguide layer;
   in the second region, the second silicon substrate layer is etched as a first air layer, the first silicon substrate layer, the first air layer, the first silicon dioxide layer, the second silicon dioxide layer, and the first silicon waveguide layer are sequentially disposed, a width of the first silicon waveguide layer gradually decreases in the direction toward the axis of symmetry, and the optical signal is gradually transmitted from the first silicon waveguide layer to a first ridge silicon dioxide waveguide layer that comprises the first silicon dioxide layer and the second silicon dioxide layer; and
   in the third region, the second silicon substrate layer is etched as the first air layer, the first silicon substrate layer, the first air layer, the first silicon dioxide layer, and the second silicon dioxide layer are sequentially disposed, wherein a width of the first silicon waveguide layer is 0 and the optical signal is transmitted at the first ridge silicon dioxide waveguide layer that comprises the first silicon dioxide layer and the second silicon dioxide layer.

2. The waveguide structure according to claim 1, wherein:
   the first silicon dioxide layer comprises:
      multiple parallel first silicon dioxide layer units that are arrayed at intervals, and
      a uniform first trench is disposed between the adjacent first silicon dioxide layer units;
   the second silicon dioxide layer comprises:
      multiple second silicon dioxide layer units, the second silicon dioxide layer units correspondingly cover surfaces of the first silicon dioxide layer units, and wherein the first silicon dioxide layer units and the second silicon dioxide layer units are comprised in the first ridge silicon dioxide waveguide layer; and
   the first silicon waveguide layer comprises:
      multiple first silicon waveguide layer units, the first silicon waveguide layer units correspondingly cover surfaces of the second silicon dioxide layer units.

3. A method for producing the waveguide structure according to claim 1, the method comprising:
   providing a first silicon-on-insulator wafer;
   producing a first silicon waveguide layer on a surface of the first silicon-on-insulator wafer;
   producing, on the surface of the first silicon-on-insulator wafer, a first ridge silicon dioxide waveguide layer that comprises a first silicon dioxide layer and a second silicon dioxide layer;
   producing a first trench on the surface of the first silicon-on-insulator wafer to shape the first silicon dioxide layer units; and
   shaping a second silicon substrate layer into a first air layer to obtain the waveguide structure by means of production.

4. A waveguide structure for use with a straight waveguide part of an arrayed waveguide in a silicon-on-insulator-based arrayed waveguide grating, the waveguide structure comprising:
   two axisymmetrically disposed first ends each divided into a first region, a second region, and a third region in a direction toward an axis of symmetry;
   a third silicon substrate layer, a third silicon dioxide layer, a second silicon waveguide layer, a first waveguide layer, and a second waveguide layer that are sequentially disposed, wherein a coverage area of the second silicon waveguide layer is less than a coverage area of the third silicon dioxide layer, the second silicon waveguide layer is partially buried in the first waveguide layer, a coverage area of the first waveguide layer is greater than a coverage area of the second waveguide layer, and refractive indexes of the first waveguide layer and the second waveguide layer both lie between a refractive index of the second silicon waveguide layer and a refractive index of the third silicon dioxide layer;
   in the first region, the third silicon substrate layer, the third silicon dioxide layer, and the second silicon waveguide layer are sequentially disposed, wherein a width of the second silicon waveguide layer is constant and the optical signal is transmitted at the second silicon waveguide layer;
   in the second region, the third silicon substrate layer, the third silicon dioxide layer, the second silicon waveguide layer, the first waveguide layer, and the second waveguide layer are sequentially disposed, wherein a width of the second silicon waveguide layer gradually decreases in the direction toward the axis of symmetry and the optical signal is gradually transmitted from the second silicon waveguide layer to a ridge waveguide layer that comprises the first waveguide layer and the second waveguide layer; and
   in the third region, the third silicon substrate layer, the third silicon dioxide layer, the first waveguide layer, and the second waveguide layer are sequentially disposed, wherein a width of the second silicon waveguide layer is decreased to 0 and the optical signal is transmitted at the ridge waveguide layer that comprises the first waveguide layer and the second waveguide layer.

5. The waveguide structure according to claim 4, wherein:
   the first waveguide layer comprises multiple parallel first waveguide layer units that are arrayed at intervals;
   the second waveguide layer comprises multiple second waveguide layer units, the second waveguide layer units correspondingly cover surfaces of the first waveguide layer units, and the first waveguide layer units and the second waveguide layer units are comprised in the ridge waveguide layer; and the second silicon waveguide layer comprises multiple second silicon waveguide layer units, and the second silicon waveguide layer units are correspondingly buried in the first waveguide layer units.

6. The waveguide structure according to claim 4, wherein materials of the first waveguide layer and the second waveguide layer are the same, and both comprise silicon nitride or polymethyl methacrylate.

7. A production method for producing the waveguide structure according to claim 4, the method comprising:
   providing a second silicon-on-insulator wafer;
   producing a second silicon waveguide layer on a surface of the second silicon-on-insulator wafer;
   producing a first waveguide layer and a second waveguide layer on the surface of the second silicon-on-insulator wafer; and
   producing a ridge waveguide layer that comprises the first waveguide layer and the second waveguide layer.

* * * * *